May 15, 1956 L. GUZZINO 2,745,212
TUFTED UPHOLSTERY AND METHOD OF MAKING SAME
Filed Jan. 24, 1955 2 Sheets-Sheet 1

INVENTOR.
LEONARD GUZZINO

May 15, 1956  L. GUZZINO  2,745,212
TUFTED UPHOLSTERY AND METHOD OF MAKING SAME
Filed Jan. 24, 1955  2 Sheets-Sheet 2
FIG. 2
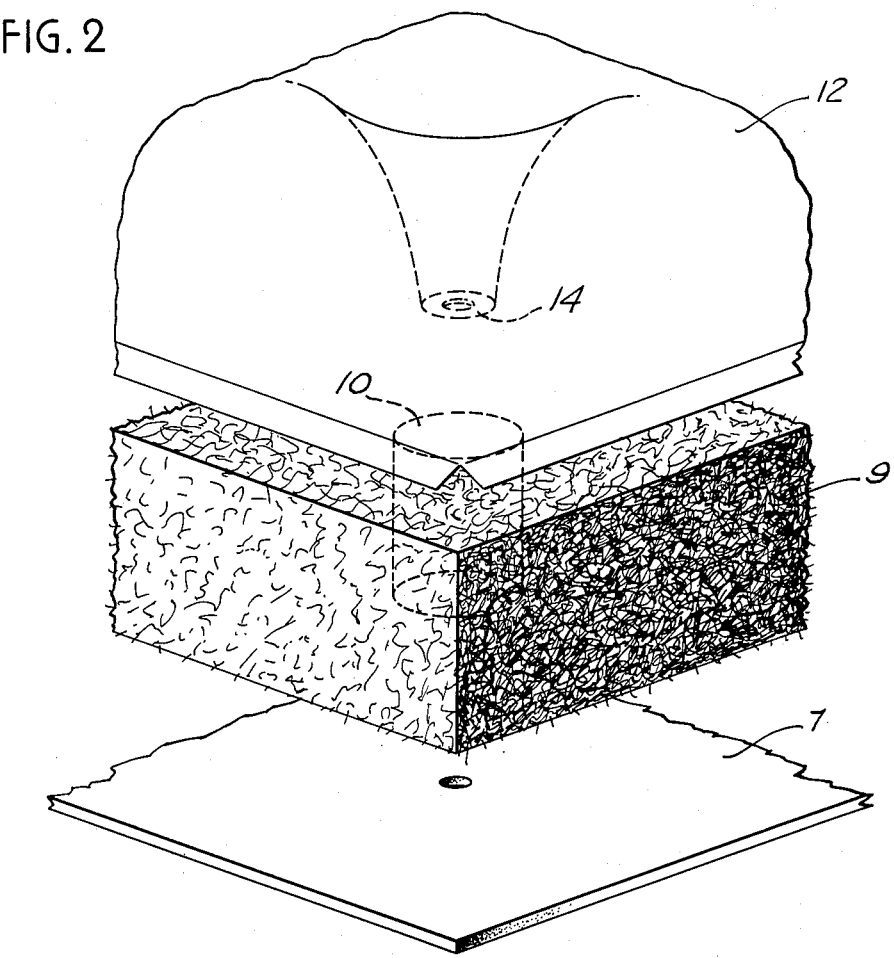
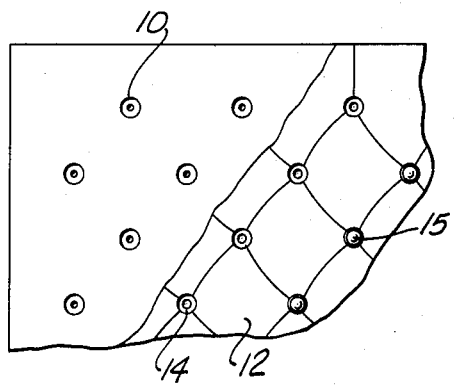
FIG. 4
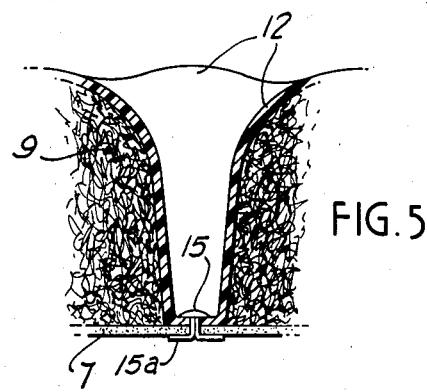
FIG. 5
INVENTOR.
LEONARD GUZZINO
BY
Roy Griffith Jones

2,745,212

TUFTED UPHOLSTERY AND METHOD OF MAKING SAME

Leonard Guzzino, Livingston, N. J.

Application January 24, 1955, Serial No. 483,628

3 Claims. (Cl. 45—138)

This invention relates to novel tufted upholstery and to a new method of making the same.

While the present invention is applicable to various articles of furniture having tufted upholstery as a part thereof, such as chairs, chaise longues, sofas, seats, etc., the following remarks will be directed to tufting made for headboards of beds, as illustrative of the generally current practice, and the description and drawings of the present invention will also be restricted to the same.

It may be stated now, that the present invention is a radical departure from past and present practices of producing such headboards, in that the use of my invention eliminates 50% of the present cost of such headboards, even as against the currently used machine process, and that several additional advantages and new results are consequent on its use, as already appreciated by those skilled in the art. As a further illustration of the importance of my invention, one man can produce 3 headboards a day, using the generally current machine process, whereas he can produce 40 a day by using my present invention.

It is well known that Hollywood beds, with their deep-tufted headboards, are expensive. This is due mostly to the time, labor, and material required to produce the upholstered and deep-tufted portion of the board, called in the trade "the tufting." In consequence, such beds, altho very popular, have had a comparatively limited sale. By reason of my present invention, however, the cost is very greatly reduced and sales have greatly increased. The above remarks apply with especial force to the hand-made headboards, which requires skilled labor, but are also applicable to the machine made boards. The hand-made boards are still produced to a very limited extent, and were the only ones available until about 5 years ago, at which time a very expensive machine was invented for the production, or rather semi-production, of such boards. The term semi-production is used due to the fact that a good deal of hand work is necessary, both before and after the machine operation, to produce the finished article. In brief outline, the following steps are necessary in the present semi-machine process. Typically, a sheet of synthetic plastic material is taken, the length and width being about twice those dimensions of the finished product. This sheet of plastic is then marked for the positions at which several dozen buttons are to be inserted thru the sheet. Then a web of cloth is glued onto the back of the sheet to strengthen it, otherwise it will rip in the subsequent machine operation. The buttons, which have long cotter-pin stems, are then individually placed in the machine by hand. A number of pounds of felt are then spread over the back of the plastic sheet, the felt being a couple of feet thick before being compressed by the machine. After this, a sheet of cardboard or chipboard is placed over the felt. Then the machine is put into operation, during which the stems of the buttons are made to pierce the several layers of material mentioned above, the felt is compressed, and the tuft-like structure is formed, including pleatings necessary to shape the tufts. Washers are then placed by hand over the cotter-pin stems of the individual buttons, and the two parts of each stem spread apart and pressed flat.

In the drawings, which illustrate one form only of my invention, as required,

Fig. 2 is an exploded view showing a backing or supporting sheet, and a pre-moulded piece of synthetic plastic material having a tufted formation, above the padding;

Fig. 4 is a fragmentary plan view showing in part the tufted plastic covering without fastening buttons and in part with such buttons, and also showing, below the covering, the padding with preformed holes thru which pass the fastening buttons; and Fig. 5 is a fragmentary vertical section thru the finished article, showing the backing sheet, the padding, and the tufted covering.

Figure 3:
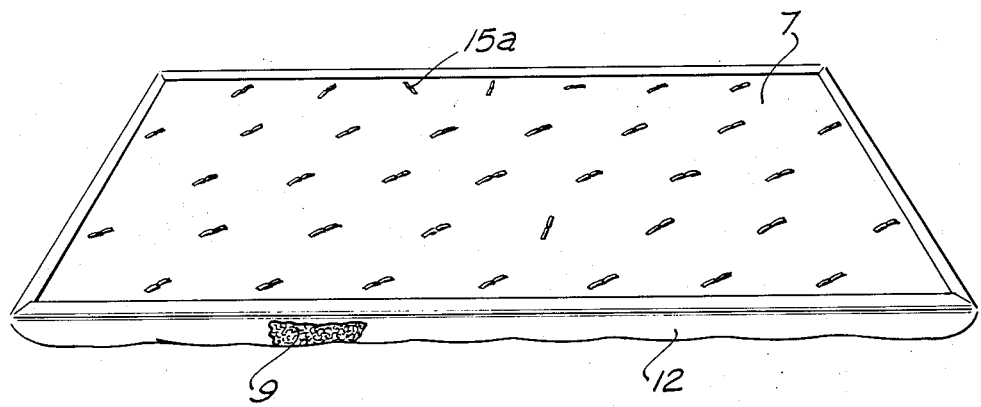
Fig. 3 is a perspective view showing the finished tufting before being applied to the frame of the headboard, the view showing the rear face up, with clinched fastening buttons, and showing also, at the bottom, the tufted synthetic plastic, and further showing, where the skirt of the latter is broken away, the layer of padding.

Referring to the drawings for a more detailed description thereof, the numeral 7 indicates a backing or supporting sheet which may be of any suitable material, such as heavy cardboard, etc., and is shown in Figs. 2, 3 and 5. A thick sheet or pad 9 of wood fibre, sometimes called cellulose padding, and usually 2 inches thick for deep tufting, is placed on the backing sheet, and has plain, parallel upper and lower faces, sides, and ends. However, before being placed on the backing sheet, the pad has a plurality of holes 10 punched thru it depthwise. These holes, which may be 1.5 inches in diameter, are an important feature of the invention and have a double function, which will be later apparent.

Figure 1:
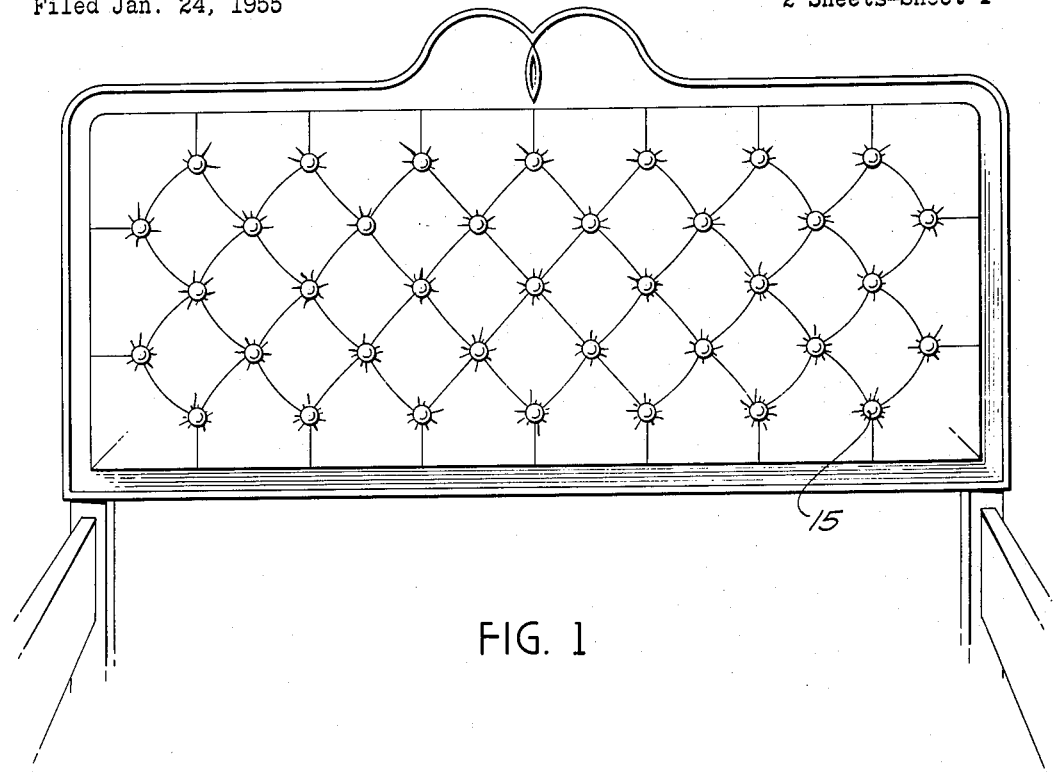
Figure 1 is an elevational view of a bed headboard which includes tufting made according to this invention.

A covering 12 is laid on the wood fibre 9. This covering is a moulded, and preferably vacuum molded, sheet of synthetic plastic material of tufted formation, and is relatively thin and pliable, being of 20 to 30 gauge vinyl plastic, to provide the desirable soft quality of textile material used in hand made tufting. This covering is placed on the padding so that the deep or intertuft areas thereof lie over the mentioned holes 10 of the padding, the number of holes corresponding to the number of intertuft areas. Pressure is then put on the latter areas, one at a time, thus pushing the intertuft areas into the holes 10. Buttons 15, having cotter-pin or split stems 15a, are then pushed thru the covering 12, the holes 10 and the backing sheet 7, and the stems are then spread apart or clinched, whereby the tufts of the covering are filled out by the padding, from their initially semi-collapsed state, to a resiliently firm condition, as shown in Fig. 5. The covering 12 may, if desired, have a flashing 17 therearound, so that the finished product may be readily secured to the frame of a bed headboard, as shown in Fig. 1. It may be further pointed out that one of the additional advantages of pre-moulding the synthetic plastic material as stated, is that the dust-gathering pleatings necessarily formed in the machine process, to form the tufts, are eliminated, so that the tufting of this invention is more easily kept clean.

It will thus be seen that I have provided a novel tufting and a novel method of making the same, which has greatly increased sales of tufted furniture, due to lower prices consequent on the great reduction of production costs effected by the invention.

What is claimed is:

1. In the making of an upholstered unit, the combination of a backing or supporting piece, a plain layer of uncompressed but compressible padding material on said backing piece, the latter having a plurality of regularly spaced, pre-formed holes depthwise therethru, a pre-moulded sheet of thin, easily flexible synthetic plastic material, having a tufted formation, lying on the uncompressed padding material, the deep or intertuft areas of the plastic material lying over the holes previously formed in the padding material, and fastening means passing thru sheet of plastic material at the deep or intertuft areas thereof and thru the holes preformed in the padding material, and also thru the backing piece.

2. An article of upholstery comprising a backing member, a layer of compressible padding material superimposed on said backing member and having formed therein a plurality of regularly spaced preformed holes, a pre-molded sheet of flexible synthetic plastic material provided with regularly spaced depressed portions to define a tufted formation, said plastic sheet being superimposed upon said layer of padding material, said depressed portions registering with said holes formed in said padding material, and means fastening the bases of said depressed portions to said backing member.

3. An article of upholstery in accordance with claim 2, wherein said padding material is in a compressed state.

References Cited in the file of this patent

UNITED STATES PATENTS

| | | |
|---|---|---|
| 185,127 | Peck | Dec. 5, 1876 |
| 678,347 | Mrock | July 9, 1901 |
| 682,139 | Freschl | Sept. 3, 1901 |
| 691,937 | Freschl | Jan. 28, 1901 |
| 1,426,720 | Dwight | Aug. 22, 1922 |